United States Patent [19]
Sigafoos

[11] Patent Number: 5,699,861
[45] Date of Patent: Dec. 23, 1997

[54] MODULAR SHOEING SYSTEM

[75] Inventor: Robert D. Sigafoos, Kennett Square, Pa.

[73] Assignee: Trustees of the University of Pennsylvania, Philadelphia, Pa.

[21] Appl. No.: 532,897

[22] Filed: Sep. 22, 1995

[51] Int. Cl.⁶ ........................................ A01L 3/02
[52] U.S. Cl. ................ 168/17; 168/12; 168/DIG. 1
[58] Field of Search ......................... 168/4, 12, 17, 168/20, DIG. 1

[56] References Cited

U.S. PATENT DOCUMENTS

| | | |
|---|---|---|
| 167,895 | 9/1875 | Hall . |
| 584,701 | 6/1897 | Pflueger ............................. 186/4 |
| 592,261 | 10/1897 | Stephens . |
| 3,490,536 | 1/1970 | Hourlier ......................... 168/12 X |
| 3,664,428 | 5/1972 | Spencer ............................. 168/4 |
| 3,782,473 | 1/1974 | Spencer ............................. 168/4 |
| 3,917,000 | 11/1975 | Spencer ............................. 168/4 |
| 3,921,721 | 11/1975 | George ............................. 168/4 |
| 4,036,302 | 7/1977 | Spencer ............................. 168/4 |
| 4,090,566 | 5/1978 | Spencer ............................. 168/17 |
| 4,206,811 | 6/1980 | Dallmer ............................. 168/4 |
| 4,235,292 | 11/1980 | Dallmer ............................. 168/4 |
| 4,237,981 | 12/1980 | Stübbe ............................. 168/4 |
| 4,265,314 | 5/1981 | Tovim ............................. 168/4 |
| 4,286,666 | 9/1981 | Nakanishi ......................... 168/4 |
| 4,346,762 | 8/1982 | Tovim ............................. 168/4 |
| 4,470,466 | 9/1984 | Nakanishi ......................... 168/18 |
| 4,557,334 | 12/1985 | Cattaneo ........................... 168/12 |
| 4,605,071 | 8/1986 | McKibben ......................... 168/12 |
| 4,691,782 | 9/1987 | Stine ............................. 168/12 |
| 4,819,731 | 4/1989 | Stübbe ............................. 168/4 |
| 4,892,150 | 1/1990 | Thoman ............................. 168/4 |
| 4,929,509 | 5/1990 | Godfrey ........................... 428/461 |
| 4,998,586 | 3/1991 | Fox et al. ......................... 168/12 |
| 5,002,132 | 3/1991 | Fox et al. ......................... 168/4 |
| 5,029,648 | 7/1991 | Stephens .......................... 168/12 |
| 5,069,289 | 12/1991 | Schaffer ........................... 168/4 |
| 5,129,461 | 7/1992 | Igrow ............................. 168/4 |
| 5,148,872 | 9/1992 | Dallmer ........................... 168/11 |
| 5,330,008 | 7/1994 | Sigafoos et al. .................. 168/12 |

FOREIGN PATENT DOCUMENTS

| | | | |
|---|---|---|---|
| 0 297 467 | 4/1989 | European Pat. Off. . | |
| 2098048 | 11/1982 | United Kingdom ........... 168/17 |

OTHER PUBLICATIONS

International Search Report from the PCT Office for International Application No. PCT/US93/11685, dated 15 Apr. 1994.

Primary Examiner—Robert P. Swiatek
Attorney, Agent, or Firm—Ratner & Prestia

[57] ABSTRACT

A kit which can be used to form a horseshoe, which can be assembled by a farrier in the field, and which can be applied to a horse using adhesives. Specifically, a kit is provided including a rigid cast polymeric sole or a horseshoe, and a rigid planar member for attachment to the sole. A hoof contacting layer (cuff) including a skirt extending therefrom is also provided. The sole, planar member, and hoof contacting layer all include a heat activated thermoplastic urethane adhesive. The kit can also include layers of shock-attenuating material also coated with the adhesive. Such shock-attenuating material may be wedge shaped. Alternatively, additional layers of rigid wedge-shaped material may be added as necessary to produce a shoe with the desired shape. Since the adhesive is heat activated thermoplastic urethane adhesive, a farrier can heat the layers in the field to activate the adhesive and glue the shoe together.

6 Claims, 4 Drawing Sheets

MODULAR SHOEING SYSTEM

BACKGROUND OF THE INVENTION

1. Field of the Invention

This invention relates to protective coverings for horses hooves including a horseshoe, a method of attaching the horseshoe to a horse's hoof, and a kit for producing the horseshoe.

2. Description of Related Art

Traditionally, horseshoes have been secured to horses hooves by means of nails. The nails are passed through holes in the horseshoe and nailed into the hoof wall of the animal. This method secures the horseshoe quite well and is very useful for horses who tread on soft ground. Such horses need be shod only once every four to eight weeks, this due to continuous hoof growth regardless of shoe wear.

As with many other things, specialized horseshoes have been developed for special purposes. Titanium and aluminum, as well as other alloy-based metal horseshoes, have been developed for lightweight use in the field of horse racing. While such shoes are strong, they are intentionally designed to be as small and lightweight as possible. Frequently, such shoes do not have high abrasion resistance. This, combined with daily workout of horses on abrasive track surfaces, tend to wear out shoes very quickly. Thus, thoroughbreds and other racehorses tend to require frequent shoeing.

For this type of use, the attachment of horseshoes to horses hooves with nails can become a problem. Frequent removal and reattachment of shoes makes numerous nail holes in the horse's hoofs. This is a problem for two reasons. First, with numerous nail holes already in the hooves, it can be difficult to find intact hoof wall into which to nail a new shoe. Second, the abundance of nail holes weakens the hoof wall which can lead to failure of the wall and damage to the horse's hoof and foot.

Noninvasive methods of attachment of hoof coverings have previously been attempted, most often without success. Generally, such methods involve a shoe covering mainly of polymeric material which is glued to a horse's hoof. Often, the glue lacks the strength and resilience necessary to withstand forces transferred through it by a horse. Because of the way in which horses gallop, the entire weight of a horse can at certain times be supported by only a single hoof. Most adhesives do not have the strength, flexibility, and toughness to withstand such forces without breaking.

Furthermore, some hoof coverings, such as that disclosed in U.S. Pat. No. 4,892,150, require special fitting of the shoe to the horse's hoof which can be time-consuming and difficult. Attempting to keep a horse's hoof in the air while a shoe is thermofit to it is difficult since a horse will not generally allow a hoof to be kept off the ground for an extended period of time.

Therefore, it is desired to create a hoof covering which can be quickly and easily attached to a horse's hoof, can withstand the forces generated by a horse at full gallop, and is lightweight enough to be useful for thoroughbred racing.

Such covering would also find usefulness where a horse's hoof is diseased, and may not be able to withstand the introduction of nails for shoeing. Furthermore, where a horse's hoof or leg is diseased, it may be desirable to provide an impact cushioning (or shock-attenuating) material in the shoe. It is believed that certain disease states are aggravated by the shock and vibration transmitted through conventional shoes. A shock-attenuating material for horseshoes must be carefully chosen in order to withstand the weight of a horse without breaking down. Further, it may also be desirable to provide a horseshoe where the bottom surface of the shoe and the surface bonded to the horse's hoof are not parallel, in order to account for temporary or permanent irregularities in the horse's stance. However, such irregularities must be accounted for on an individual basis, differing possibly from hoof to hoof. Accordingly, the system must provide for the production of each horseshoe by a farrier. Mass-produced horseshoes which attempt to account for irregularities in a horse's stance or gait, would be useless, as by their very nature such irregularities vary from horse to horse, and quite possibly, between the legs of a single animal.

SUMMARY OF THE INVENTION

The present invention overcomes these and other difficulties by providing a kit to produce a horseshoe which can be assembled by a farrier in the field, and applied to a horse using adhesives. Specifically, a kit is provided including a rigid cast polymeric sole or a horseshoe, and a rigid planar member for attachment to the sole. A hoof contacting layer including a fabric skirt extending therefrom is also provided. The sole, planar member, and hoof contacting layer all include a heat activated thermoplastic urethane adhesive. The kit can also include layers of shock-attenuating material which are also coated with the adhesive. Such shock-attenuating material may be wedge-shaped. Furthermore, additional layers of flat or wedge-shaped shock-attenuating material may be added as necessary to produce a shoe with the desired shape. Since the adhesive is heat activated thermoplastic urethane adhesive, a farrier can heat the layers in the field to activate the adhesive and glue the shoe together.

The finished horseshoe and the method of making the shoe are also provided.

DETAILED DESCRIPTION OF THE INVENTION

Where horseshoes are to be made for horses with special problems, a farrier must be able to configure the horseshoe with a particular horse and hoof in mind. Accordingly, it is important that a kit be provided which allows flexibility in designing and assembling different types of shoes. The present invention provides such a kit which may be used for producing a wide variety of shoe types, with a wide variety of materials and many different configurations.

Figure 1:
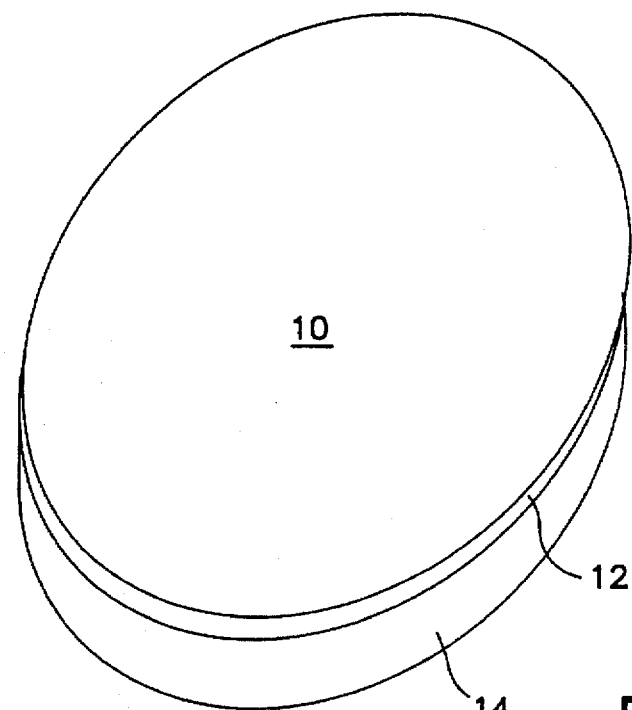
FIG. 1 is a perspective view of the lower portion of a horseshoe made in accordance with the present invention.
Figure 3:
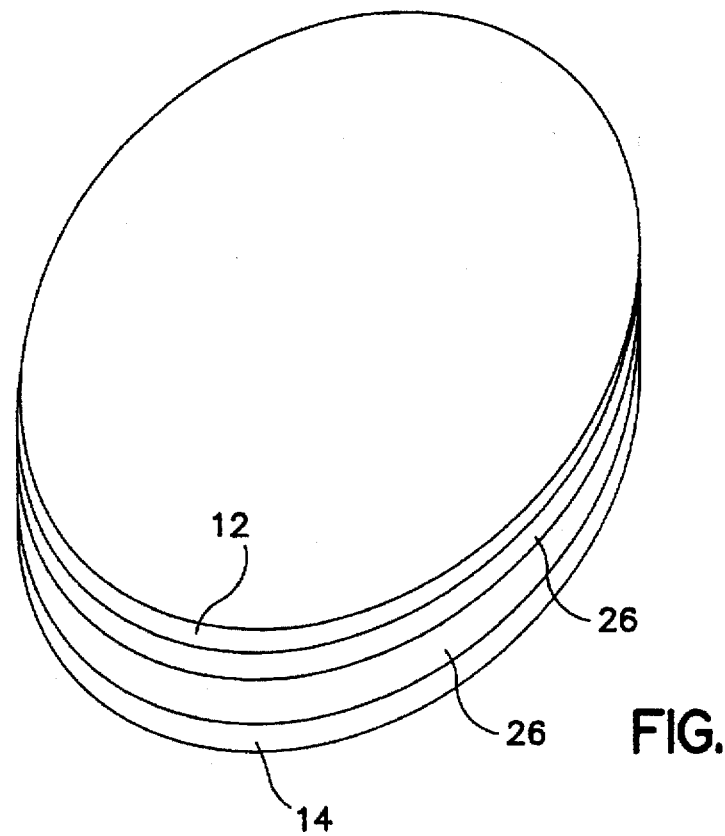
FIG. 3 is a perspective view of the lower portion of a horseshoe made in accordance with the present invention.
Figure 4:
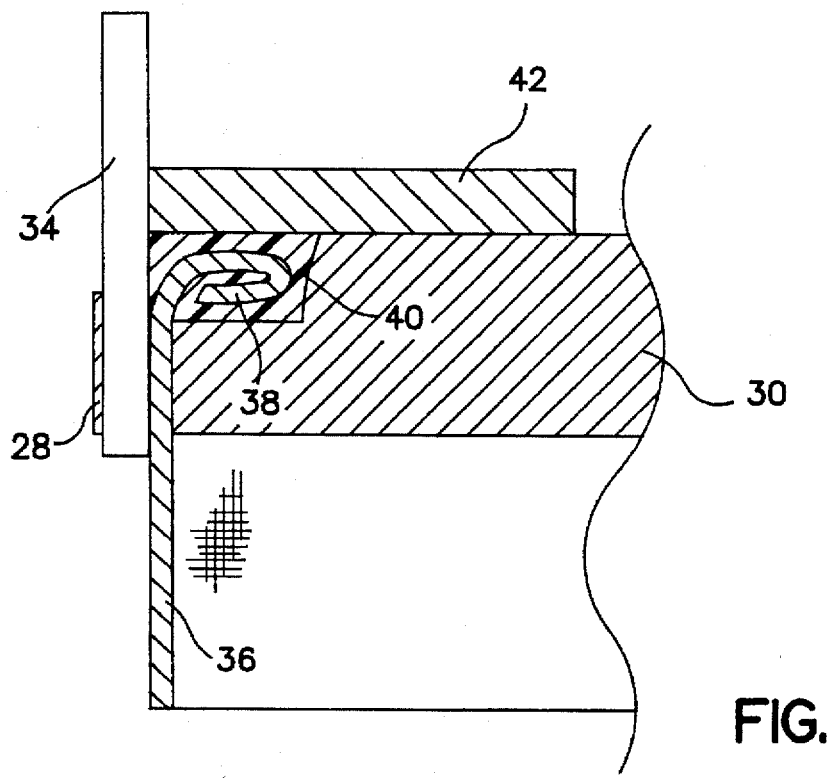
FIG. 4 is a cross-sectional view of the cuff of the present invention and a mold for forming the cuff.
Figure 5:
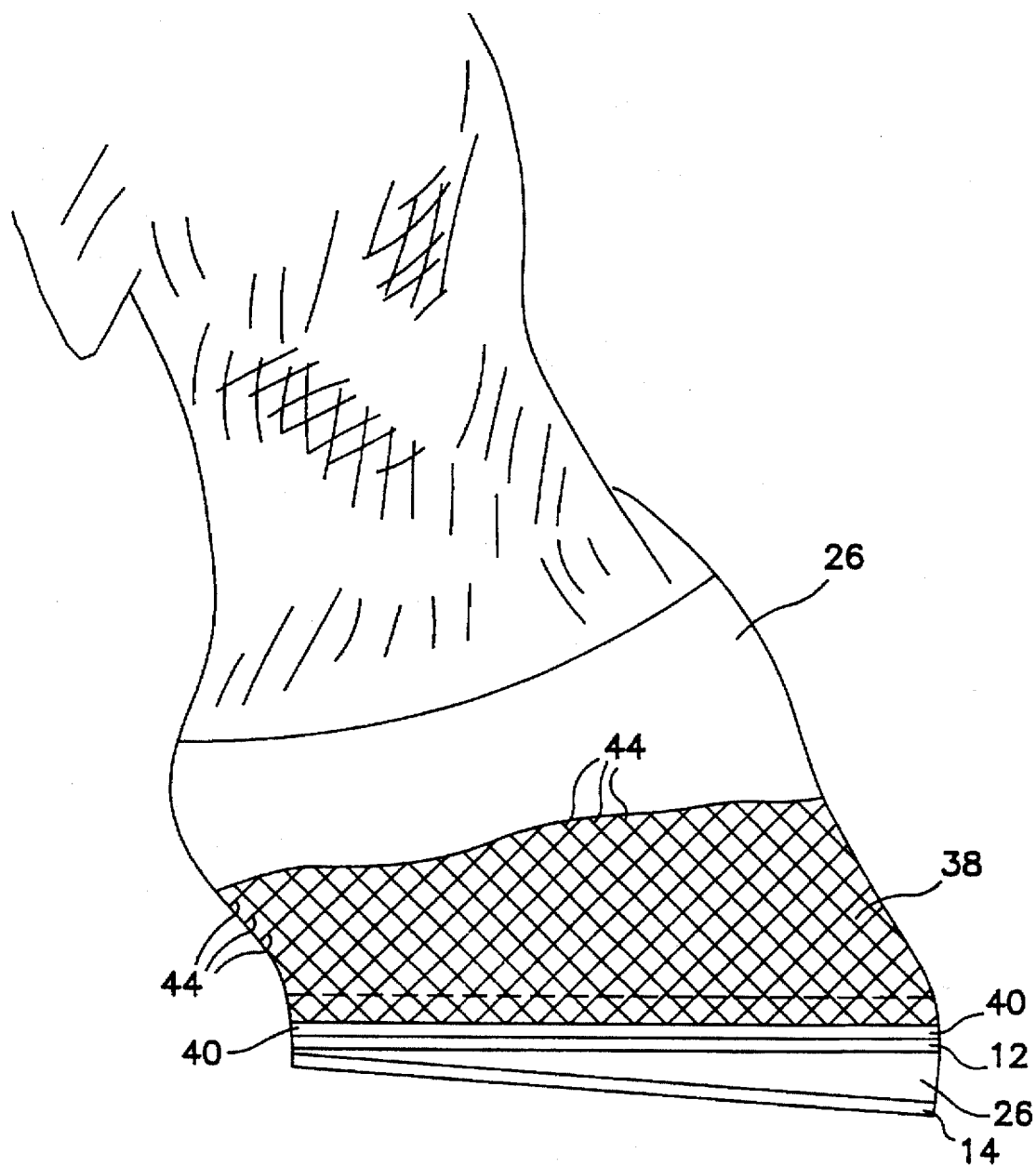
FIG. 5 is a side view of a horseshoe made according to the present invention mounted on a horse's hoof.
Figure 6:
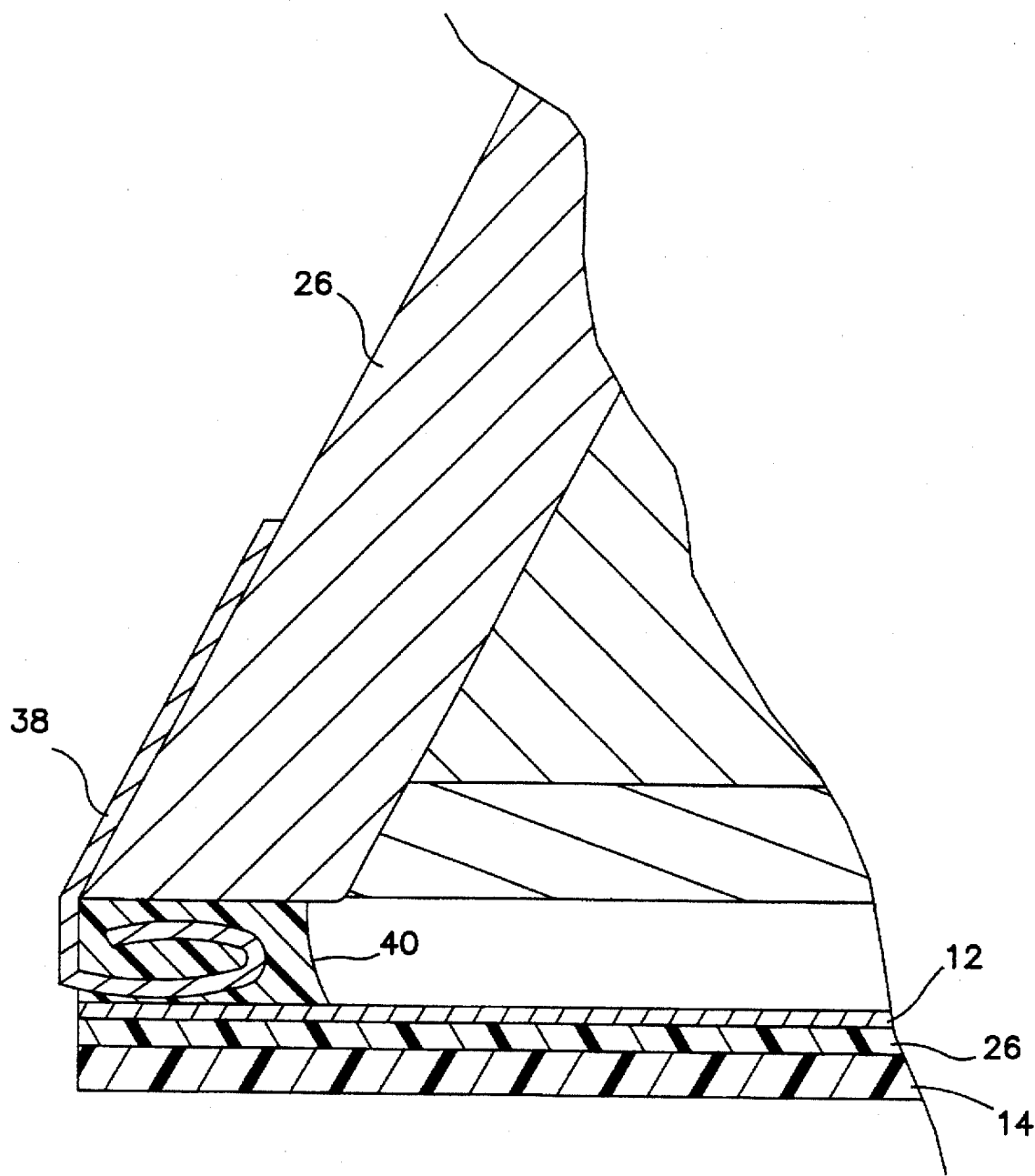
FIG. 6 is a cross-sectional view of a horseshoe made according to the present invention mounted on a horse's hoof.

Exemplary of the shoes which may be produced using the kit of the present invention are those as shown in FIGS. 1 and 3. FIG. 1 shows the base 10 of a bar shoe in the form of a closed oval (an egg bar shoe). Base 10 has a rigid plate 12 and a sole 14. Rigid plate 12 can be made from any suitably rigid material such as polycarbonate, ABS, aluminum, steel, and filled resin composites. Sole 14 is generally formed from a low rebound polyurethane. Specifically, good results have been obtained by using Adeprene 600D™ obtained from the Uniroyal Chemical Company. However, any other of a wide variety of polyurethanes can also be used.

Alternatively, it may be appropriate to form sole plate 14 from a polycarbonate or other material if reduced traction for the treatment of certain types of lameness in the horse is desired. Generally, however, the reduction of traction is not desired. Accordingly, sole plate 14 can be molded with ridges or other traction producing surface on the underside of sole plate 14.

Figure 2:
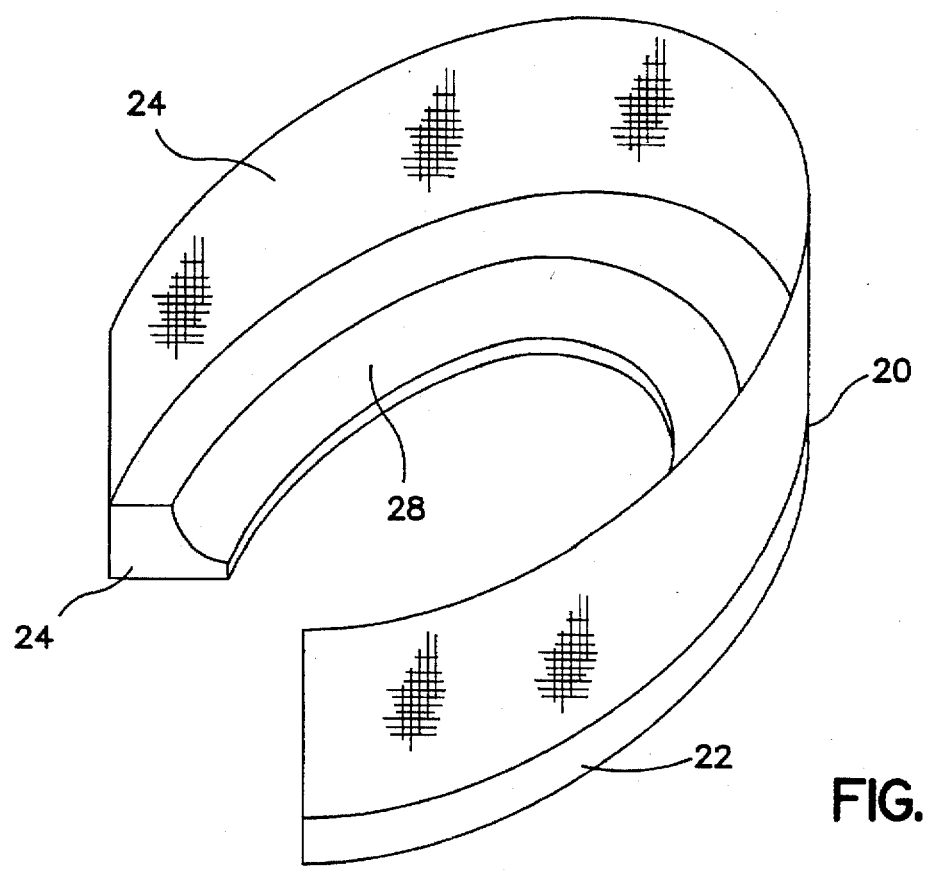
FIG. 2 is a perspective view of the cuff of a horseshoe made in accordance with the present invention.

While this produces the bearing portion of a shoe, base 10 has no provision for attachment to a horse's hoof. The means of attachment is shown in FIG. 2. FIG. 2 shows cuff 20 including polymeric shoe bed 22 and skirt 24. Skirt 24 is embedded in polymeric shoe bed 22 and extends upwards out of shoe bed 22. This cuff is used to attach a shoe to the hoof of a horse. It is one component of the kit of the present invention.

The kit of the present invention will allow a farrier to make any one of a vast number of different polymeric shoes for horses. The kit comprises all the components necessary to assemble and attach a horseshoe to a horse's hoof. The kit is intended to provide flexibility in designing and assembling horseshoes. The kit includes at a minimum a cast polymeric sole and a cuff. The kit can also include further components including a rigid plate and shock attenuating layers, both flat and wedge-shaped. This sole is in the form of a cast square or rectangular block. In fact, most of the components are in block form in the kit except the cuff, which is preformed.

The cast urethane sole block is generally formed with ridges or some other traction enhancing surface on the underside of the sole block. In some cases, as previously mentioned, it may be desirable to produce a sole with low friction surface. In this case, no traction enhancing surface should be cast into the sole block. The sole block may either be solid polyurethane, or, alternatively, it may be formed with a shock-attenuating layer embedded in the sole. A shock-attenuating layer can be any suitable material, including a closed cell foam such as EVA (ethylene-vinyl acetate), or some other suitable cushioning material such as Hexalite™ thermoplastic honeycomb material available from Hexcel Corporation. If such a shock-attenuating material is incorporated, the resulting sole block has a layer of urethane, with the shock-attenuating material on top, and another layer of urethane covering the shock-attenuating material layer.

The urethane plate is formed by casting the plate in a mold. The mold is preheated to 250° F. and the desired urethane (such as Adeprene 600D™, or Vibrathane 6060™ available from the Uniroyal Chemical Company) is prepared and poured into the mold. The urethane is cured at a suitable temperature and time according to the manufacturer's directions. A cure of 16 hours at 250° F. is typical. The plate is then unmolded and allowed to cool. Once cooled, a heat activated thermoplastic urethane adhesive (such as product #2332 from Worthen Industries or #4693 Plastic Adhesive from 3-M Corporation) is applied and allowed to air dry for about 30 minutes. Other suitable adhesives can also be used, bearing in mind that such adhesives must have the strength and resiliency to withstand the forces imposed by the weight of a horse. Once dried, a release liner is applied over the adhesive. A suitable liner for the urethanes named above is Mylar™, which is a polyethylene terephthalate (PET) available from E. I. DuPont De Nemours Company. The plate is then trimmed to a suitable size (6"×7"). Generally, the sole plate should be at least about ½" in thickness to provide sufficient strength and stability to act as a sole plate in a horseshoe.

Where a shock-attenuation is desired to be incorporated into the plate, the process is as above except that once the urethane has been poured in the mold to a depth sufficient to cover the tread pattern tooling, the shock-attenuating core material is then positioned into the mold. Surface treatment of that material may be necessary depending on the material chosen. Commonly, the shock-attenuating layer is treated with an alcohol wash or some similar treatment prior to incorporation in sole layer. Treatment with Chemlok 213™ may also be required to ensure adhesion to the remaining layer of the shoe. The mold is then filled to the upper surface, covering the core material. A flat plate 42 is then placed into the mold and clamped into position to form a flat surface on the cuff. The assembled mold is cured as appropriate, as set forth above. Again, after curing, a heat activated thermoplastic urethane adhesive is applied and a release liner is applied over the adhesive.

As previously explained, the shoe is secured to the horse's hoof by a cuff 20, shown in FIG. 2. Cuff 20 is preferably produced as follows. As shown in FIG. 1, a form 30 is prepared with a base 32 and an outer dam Base 32 is generally horseshoe-shaped. A sheet material 38 is wrapped around base 32, forming a large skirt 24, extending beneath the base. Skirt 24 can be as long as desired but should be at least 1 to 2 inches since it will aid in securing the covering to the horse's hoof. Sheet material 38 is preferably a molded thermoplastic sheet, but can also be a woven or non-woven polymeric fabric, or a natural material such as canvas or leather.

If sheet material 38 is a molded thermoplastic sheet, it is preferably formed from a thermoplastic ABS or polyurethane. One suitable thermoplastic polyurethane is Pelethane™ available from Dow Corning of Midland, Mich. One suitable thermoplastic ABS is Royalite™ available from Uniroyal Chemical of Naugatuck, Conn. Alternatively, sheet material 38 may be formed from polyvinyl chloride (PVC) including copolymers of PVC such as Kydex™ available from Rohm and Haas Company of Philadelphia, Pa.; polypropylene; polyethylene, and its derivatives; polyamides; polyesters; polycarbonate; and other suitable thermoplastic materials. Thermoplastic materials are preferred since a thermoplastic may be heated and formed to the shape of the particular hoof to which the shoe is to be applied.

If sheet material 38 is a fabric, it is preferably a woven polyethylene fabric. Particularly, Spectra™ woven polyethylene fabric has been used with excellent results. Spectra™ is woven polyethylene fabric available from Allied Signal Corporation of Morristown, N.J.

Finally, sheet material 38 may be a laminate, formed from several individual layers of material. Thus, skirt 24 can be formed from a layer of woven polyolefin, laminated between two layers of molded thermoplastic sheet material. This combines the abrasion resistance and adhesive bondability of the molded thermoplastic sheet material with the durability and flexibility of the woven polymeric fabric. Preferably, the individual layers are about ⅟32" thick. If only a single sheet of molded thermoplastic material is used, it should have a thickness of about ⅟16". Further, in place of the laminated material previously described, a molded thermoplastic sheet material internally reinforced with fibers, may be used as sheet material 38 to form skirt 36.

Around sheet material 38 is wrapped outer dam 34. Outer dam 34 is generally made of rubber or some other resilient material. Outer dam 34 is secured in place by clamp 28. The form, including the fabric and base, are preheated to 200° F.

Polymeric resin 40 is then poured around the periphery of the inside of form 30, forming a horseshoe shape. A flat plate 42 is then placed on top of polymeric resin 40. A particularly preferred polymeric resin is Adeprene L100™ resin from the Uniroyal Company, which is a thermosetting polyurethane. The form, plate, polyurethane, and sheet material are then heated at 200° F. for 12 hours to allow the polyurethane to cure completely. A higher temperature may be appropriate depending on the particular polyurethane used.

Once cured, clamp 28 and outer dam 34 are removed, as is flat plate 42. Cuff 20 can then be removed from mold 30. As previously stated, the selection of polymeric resin 40 will, to some extent, dictate the polymeric fiber fabric used for sheet 38, as well as the method of making cuff 20. If a polymeric resin which can be molded and cured at about 250° F. or less is selected, fabric made from a polyolefin (which would melt at higher temperatures) may be used. If a polymeric resin which must be cured at a higher temperature (or a thermoplastic which must be molded) is used, the fabric made from a material which is stable at higher temperatures must be used.

For instance, a thermosetting polyurethane, which sets below 250°, can be used with a polyolefin fabric (e.g., polyethylene) with, or without molded thermoplastic sheets. This combination is preferred. The cuff can then be poured-formed or injection molded. Once formed, the cuff is heated to the cure temperature for the polyurethane. Similarly, an acrylic such as polymethylmethacrylate can be used with a polyolefin fabric.

If a high temperature (i.e., above 250° F.) operation is used, such as injection molded polyester, a more heat resistant fabric should be employed. Several polyaramides would be appropriate. Further, the skirt must be secured in the mold to prevent movement during molding. Particularly, Kevlar™ available from DuPont De Nemours, E. I., Company of Wilmington, Del., can be used at higher temperatures. Other polymeric resins useful in forming the cuff of the present invention include ABS (acrylonitrile-butadiene-styrene), SAN (styrene-acrylonitrile), polycarbonate, polystyrene, acrylics, polyurethane, and similar resins. (Additional skirt materials include Cobra Sox™ available from Atkins and Pearce which is a hybrid carbon fiber with Kevlar™ from DuPont, or Spectra Fiber™ available from Allied Signal, or fiberglass). Particularly preferred is thermosetting polyurethane as the resin with woven polyethylene as the polymer fiber fabric, with or without molded sheets overlying the polyurethane.

Once cuff 20 is prepared, the face of cuff 20 which was formed using flat plate 42 is then treated with a solvent, for cleaning, and coated with an elastomeric adhesive and allowed to air dry for one hour. Specifically, Chemlok 213™ from Lord Chemical Corporation has been found effective. The adhesive is post cured for 2 hours at 250° F. The cuff is then cooled to room temperature. The same surface is then coated with a heat activated thermoplastic urethane adhesive, as set forth above, and allowed to air dry for 30 minutes. The adhesive is then covered with a protective release liner.

As previously explained, shoe 10 will normally include a rigid plate 12, but the use of such a plate is optional. The preparation of such a plate will vary depending on the type of material used and the type of polyurethane in the sole. As an example, an aluminum plate could be prepared as follows. First, the plate would be cleaned with a commercial chromatic conversion. After this, the plate should be spray coated with an elastomeric adhesive such as Chemlok 219™ available from Lord Chemical Company. The plate is allowed to air dry for 1 hour, consistent with the instructions for use of the elastomeric adhesive. A second layer of adhesive is applied. In this case, Chemlok 213™ was used. Chemlok™ products are available from Lord Chemical Company. After coating with the Chemlok 213™, the aluminum plate is allowed to dry for 1 hour. The adhesives are post cured 250° F. for 2 hours.

Steel plates can be bonded using the above-described procedure for aluminum but eliminating the chromate conversion step. Polycarbonate plates do not require any preparation other than an alcohol degrease. Epoxy laminates can be bonded using an alcohol degrease followed by a light surface abrading. ABS can be bonded by using an alcohol degrease followed by a light surface abrading. Thereafter a thin layer of 6060 Vibrathane™ is poured onto the surface of the ABS (this must be done twice if the ABS is used as an intermediate layer). The 6060 Vibrathane™ acts as an adhesive interface for most other types of castable high performance urethanes. After preparation as above, the plates are coated on both sides with a heat activated thermoplastic urethane adhesive. A release liner is then applied to both sides of the coated plate. Alternatively, any of these paltes, after preparation, can be incorporated directly into the sole of the shoe if a single component system is desired.

In addition to the sole and rigid plate, horseshoes assembled in accordance with the present invention can also include mid-soles formed from shock-attenuating materials. Specifically, the shoe can incorporate such materials as EVA (ethylene-vinyl-acetate), low rebound urethane, or engineered materials such as Hexalite™ thermoplastic urethane honeycomb (available from Hexcel Corporation). These materials can reduce the transmission of shock and vibration from the sole to the horse's hoof. It is believed that shock and vibration contribute to the progression and formation of several different disease states in horses. Accordingly, shock attenuation is highly desirable.

Preparation of mid-sole components is straightforward. The components are cleaned and coated with a heat activated thermoplastic urethane adhesive which is allowed to air dry. A release liner is applied over the adhesive. If appropriate, the plate is trimmed to size (6"×7"). Pretreatment is generally unnecessary, but mid-sole components can be pretreated prior to application of the adhesive depending on the material chosen for the mid-sole. Furthermore, in the case of an EVA mid-sole, or a mid-sole formed from a low rebound urethane or other similar shock-attenuating material, the mid-sole need not be flat, but can be in the form of a wedge. This can be very useful where it is desirable to cant the hoof of the horse in one direction or another. The wedge could be applied with the thick portion of the wedge facing almost any direction desired. Thus, an unnatural or harmful hoof position can be corrected either temporarily, for therapeutic reasons, or permanently. Similarly, the thickness of mid-sole can be varied from hoof to hoof in order to account for temporary or permanent unevenness in limb length among the four limbs. In the case of EVA and similar materials, the wedge or block can be cut prior to preparation. However, the wedge or block cannot be cut in half horizontally by the end user since the faces are coated with adhesive, and splitting the block would expose fresh, adhesive-free faces which could not be bonded.

Generally, the mid-sole wedge will be formed from EVA because it is easily available and shapeable. Flat plates are most preferably formed either from EVA or from an engineered material such as Hexalite™. The thickness of the plates can vary. Generally, thicknesses on the order of 5 mm are typical. A kit may incorporate a variety of thicknesses. Since the mid-sole materials are coated with adhesive, it would generally be not possible to shave down a mid-sole plate in order to achieve a desired thickness. Accordingly, it might be appropriate to include a variety of thicknesses such as 2, 4, and 8 mm in order to allow the use of even thicknesses up to 14 mm by combining the plates. Similarly, wedges of different angles can be incorporated. Generally, these wedges will have angles on the order of 2°–10°.

At a minimum then, a kit will include a cast urethane sole, a rigid plate, and a cuff where the sole is coated on one side with a heat activated thermoplastic urethane adhesive. The plate is coated on both sides with the adhesive, and the cuff is coated on one side with the adhesive. The sole may incorporate shock-attenuating material in it. The kit can further include several mid-sole components, each coated on both sides with the heat activated thermoplastic urethane adhesive. Every surface coated with that adhesive will also include a release liner.

A farrier will use the kit to assemble a shoe for a horse in the following manner. First, the hoof is trimmed and prepared in a normal manner with the outside of the hoof wall sanded around its circumference. The rigid plate is placed against the bottom of the hoof and the outline of the hoof is traced onto the mylar release liner on one surface of the plate. If no plate is used, this can be done with the sole. The release liner on the underside of the plate and that on sole are removed. Both the underside of the plate and the sole are heated with a heat gun to 160° F.–180° F. and are then bonded together. Contact between the two surfaces can be improved by hammering the plate on the sole, or by compressing in a vice. If no plate is used, obviously this step is omitted.

The plate is then cut by following the traced outline using a jigsaw, reciprocating saw, band saw, or other suitable equipment. Any type of shoe can be cut the kit can be used to make a full plate shoe, a bar show (egg bar, straight bar, heat bar, etc.) or an open shoe. Clearly, if the bar shoe is desired, a band saw cannot be used but a jigsaw would be appropriate. Once the plate and sole are cut, the cuff is placed on the plate for size, and cut to the appropriate length if necessary. The release liners are then removed from the cuff and the plate to expose the adhesive. The adhesive surfaces are heated with a heat gun to 160° F.–180° F. and are bonded together in the appropriate position. The shoe is then finished and can be bonded to hoof 26.

Where mid-soles are to be incorporated, the procedure is as above, except that prior to cutting, the mid-sole plates and the sole are bonded to the rigid plate. Once the assembly has taken place, the resulting composite is cut with a band saw, reciprocating saw, jigsaw, or other appropriate cutting tool. Assembly then continues as set forth above. An assembled egg bar shoe incorporating mid-sole materials, and made in accordance with the present invention is shown in FIG. 3. In this case, 2 mid-sole plates are shown as reference numeral 26. The plates are interchangeable, or could be removed and replaced with a single thicker plate.

Once the shoe assembly is completed, the shoe can then be applied to a hoof. The shoe assembly is applied using an acrylic adhesive. In order to secure the shoe assembly, the horse's hoof is first prepared using a rasp or file in the same way in which it would be prepared for a conventional shoe. Once prepared, the warm shoe (either still warm from the previous treatment or rewarmed) is fitted to the hoof and skirt 24 is formed to the hoof. This step may be eliminated if the skirt 24 is formed from only a flexible fabric material.

While the horse's hoof is held off the ground, a bead of fast curing methacrylate-based structural adhesive is applied to the underside of the hoof of the horse. Two part 100% reactive methacrylate-based structural adhesives are preferred since they are strong and can be very fast setting. Further, their acrylic properties allow the adhesives to bond with the proteinaceous hoof wall of the animal with a strong bond, while also adhering strongly to polymeric resins such as polyurethane. Versilok 202™ from Lord Corporation of Erie, Pa., is an excellent modified acrylic structural adhesive for this purpose. It is based on methyl-2-propenoate (methyl methacrylate) with an accelerator of benzoyl peroxide, diisobutyl phthalate, and a bisphenol. Alternatively, Versilok 403™ (also from Lord Corporation) can be used in combination with Versilok 19™ accelerator. This system has similar chemistry to the Versilok 202™ system, but provides a slightly slower cure and a stronger bond.

Also, while maintaining the hoof of the horse off the ground, a somewhat slower methacrylate-based adhesive is applied up around the sides of the hoof where skirt 36 will contact the hoof. Versilok 402™, also from Lord Corporation and also based on methyl-2-methyl-2-propenoate, is useful but is somewhat tacky even when fully cured. Versilok 403™ is less tacky while providing the necessary strength but is a slower cure than Versilok 402™. Either adhesive is effective when used in the present invention as are other fast setting acrylic adhesives. The shoe assembly is then set onto the hoof. The open time for the fast curing acrylic adhesive (Versilok 202™) is approximately 2–4 minutes.

After this, the horse's hoof can be placed back on the ground. The slower setting adhesive should set in about 8 to 10 minutes which allows manipulation of skirt 24 if necessary after the hoof has been set back on the ground. Skirt 24 can be smoothed out and more adhesive added, if needed. Portions of skirt 24 can also be trimmed away during this time. If skirt 36 includes a molded thermal plastic sheet, reheating may be necessary to reform the material. It is important that in all of the heating steps in this method, a heat gun be used, not an open flame torch. This is because the adhesives are all flammable. Accordingly, open flames should be avoided.

The adhesive will achieve full strength in about 2 hours, after which no further adjustments will be necessary. Further information regarding the use of horseshoe assemblies including a skirt for adhesive mounting on horses hooves can be found in U.S. Pat. No. 5,330,008 to Sigafoos et al., issued Jul. 19, 1994, which is incorporated herein by reference.

It is understood that various other modifications will be apparent to and can be readily made by those skilled in the art without departing from the scope and spirit of this invention. Accordingly, it is not intended that the scope of claims appended hereto be limited to the description as set forth herein, but rather that the claims be construed and encompassing all the features of patentable novelty that reside in the present invention, including all features that would be treated as equivalents thereof by those skilled in the art to which this invention pertains.

What is claimed:

1. A kit for making a horseshoe comprising:

a cast polymeric sole;

a rigid planar member;

a hoof-contacting layer; and a cuff having a skirt embedded therein and extending therefrom for attachment to a horse's hoof;

wherein each of said sole, planar member, and hoof-contacting layer includes thereon a layer of a heat-activated thermoplastic urethane adhesive and a release layer overlying said adhesive.

2. A horseshoe comprising:

a cast polymeric sole;

a layer of a shock attenuating material bonded to said sole;

a rigid planar member bonded to said layer of shock attenuating material, said layer of shock attenuating material having substantially the same size and shape as said rigid planar member;

a hoof-contacting layer bonded to said rigid planar member; and a fabric layer embedded in and extending from said hoof-contacting layer to form a skirt for attachment to a horse's hoof.

3. A horseshoe comprising:

a cast polymeric sole;

a wedge-shaped layer of a shock attenuating material bonded to said sole;

a rigid planar member bonded to said layer of shock attenuating material;

a hoof-contacting layer bonded to said rigid planar member; and a fabric layer embedded in and extending from said hoof-contacting layer to form a skirt for attachment to a horse's hoof.

4. The horseshoe of claim 3 further including a layer of a heat-activated thermoplastic urethane adhesive between said sole and said rigid planar member.

5. A kit for making a horseshoe comprising:

cast polymeric sole;

generally planar layer of shock attenuating material;

a rigid planar member;

a hoof-contacting layer; and a cuff having a skirt embedded therein and extending therefrom for attachment to a horse's hoof;

wherein each of said sole, planar member, layer of shock attenuating material, and hoof-contacting layer includes thereon a layer of a heat-activated thermoplastic urethane adhesive and a release layer overlying said adhesive.

6. A kit for making a horseshoe comprising:

a cast polymeric sole;

a wedge-shaped layer of shock attenuating material;

a rigid planar member;

a hoof-contacting layer; and a cuff having a skirt embedded therein and extending therefrom for attachment to a horse's hoof;

wherein each of said sole, planar member, layer of shock attenuating material, and hoof-contacting layer includes thereon a layer of a heat-activated thermoplastic urethane adhesive and a release layer overlying said adhesive.

* * * * *